United States Patent
Churcheart

(10) Patent No.: US 9,956,497 B2
(45) Date of Patent: May 1, 2018

(54) SALTWATER EVAPORATION MECHANISM

(71) Applicant: Carei Nical Churcheart, Ventura, CA (US)

(72) Inventor: Carei Nical Churcheart, Ventura, CA (US)

(*) Notice: Subject to any disclaimer, the term of this patent is extended or adjusted under 35 U.S.C. 154(b) by 172 days.

(21) Appl. No.: 15/180,920

(22) Filed: Jun. 13, 2016

(65) Prior Publication Data

US 2016/0361666 A1  Dec. 15, 2016

Related U.S. Application Data

(60) Provisional application No. 62/174,850, filed on Jun. 12, 2015.

(51) Int. Cl.
*B01D 5/00* (2006.01)
*B01D 1/00* (2006.01)
*B01D 3/02* (2006.01)
*C02F 1/14* (2006.01)
*B01D 3/00* (2006.01)
*C02F 103/08* (2006.01)

(52) U.S. Cl.
CPC ......... *B01D 1/0017* (2013.01); *B01D 1/0035* (2013.01); *B01D 3/02* (2013.01); *B01D 5/006* (2013.01); *C02F 1/14* (2013.01); *C02F 2103/08* (2013.01); *C02F 2201/009* (2013.01)

(58) Field of Classification Search
CPC ... B01D 1/00; B01D 3/00; B01D 3/02; B01D 5/00; C02F 1/14
See application file for complete search history.

(56) References Cited

U.S. PATENT DOCUMENTS

| | | | |
|---|---|---|---|
| 2,342,062 A | 2/1944 | Schenk | |
| 4,142,512 A | 3/1979 | Brown | |
| 4,247,369 A * | 1/1981 | Bean | B01D 1/0017 202/176 |
| 5,067,272 A | 11/1991 | Constantz | |
| 5,552,022 A | 9/1996 | Wilson | |
| 7,832,714 B2 | 11/2010 | Duesel, Jr. et al. | |
| 2014/0054159 A1 | 2/2014 | Bosch | |

* cited by examiner

*Primary Examiner* — Brian A McCaig

(57) ABSTRACT

A saltwater evaporation mechanism for the desalination of saltwater. The saltwater evaporation mechanism has an elevated saltwater reservoir with a bottom, sidewalls and an open upper end, a receiving reservoir with a bottom, sidewalls, and an open upper end, and a tunnel extending therebetween. The tunnel has a top panel, a bottom panel, and two side panels and is angled at a downward slope. The top panel extends from the tunnel to entirely cover the open upper end of the saltwater reservoir. Support legs equipped with wheels are positioned below the tunnel, allowing the tunnel to be easily moved and rotated when desired. A heat source is positioned underneath the saltwater reservoir and configured to heat the contents therein, creating water vapor. The water vapor condenses into desalinated water in the tunnel and is deposited in the receiving reservoir. In some embodiments, the heat source is powered by solar energy.

7 Claims, 2 Drawing Sheets

SALTWATER EVAPORATION MECHANISM

CROSS REFERENCE TO RELATED APPLICATIONS

This application claims the benefit of U.S. Provisional Application No. 62/174,850 filed on Jun. 12, 2015. The above identified patent application is herein incorporated by reference in its entirety to provide continuity of disclosure.

BACKGROUND OF THE INVENTION

The present invention relates to the desalination of saltwater. More specifically, the present invention provides a mechanism wherein saltwater is distilled by heating up the saltwater and moving the resulting water vapor that is produced by the heat through a tunnel toward a receptacle, separating water from the salt present in saltwater. The present invention can be powered by solar energy.

Fresh water is among the most important resources for life on earth. Water is not only needed for direct human consumption, but for basic food production as well. It is essential for both growing agricultural crops as well as for the feed and care of livestock. Water is also used in a multitude of household and industrial uses as varied as bathing, washing clothing and cooling machinery. Many power plants also use water in the production of electricity by burning a fossil fuel and heating up water to create steam that is used to turn large turbines that power electric generators. Many of these applications require fresh water or water with a lower salt concentration. Unfortunately, fresh water is a scare commodity as there is a limited quantity available for use, and the quantity that is available can be expensive. Conversely, ocean saltwater comprises upwards of 90% of the water found on the planet. Therefore, there is a need for an efficient method of removing the salt from the abundantly available saltwater to produce consumable and useable fresh water.

SUMMARY OF THE INVENTION

In view of the foregoing disadvantages inherent in the known types of desalination methods now present in the prior art, the present invention provides a saltwater evaporation mechanism wherein the same can be utilized for providing convenience for the user when desalinating water. The saltwater evaporation mechanism comprises an elevated saltwater reservoir having a bottom, side walls and an open upper end, a receiving reservoir having a bottom, side walls and an open upper end, and a tunnel extended therebetween. The tunnel has a top panel, a bottom panel, and two side panels forming an interior with a first end and a second end. The top panel extends beyond the first end of the tunnel such that it entirely covers the open upper end of the saltwater reservoir. The second end of the tunnel is positioned above the receiving reservoir. A heat source is positioned underneath the saltwater reservoir and configured to heat the contents therein, creating water vapor. The water vapor condenses into desalinated water in the tunnel and is deposited in the receiving reservoir. In some embodiments of the saltwater evaporation mechanism, the heat source is powered by solar energy. Support legs equipped with wheels are disposed below the tunnel and the extended top panel, allowing the tunnel to be easily moved and rotated when desired.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
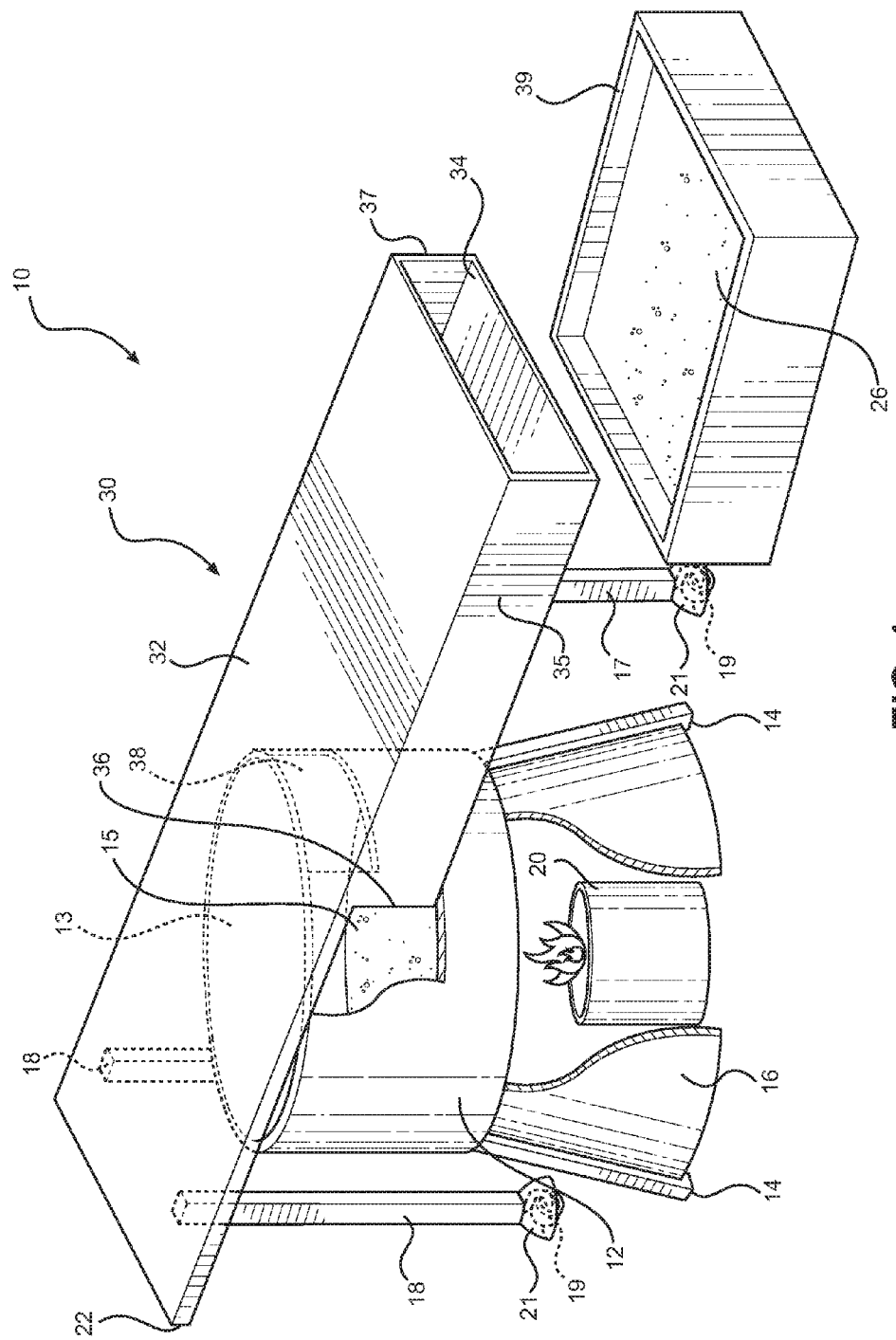
FIG. 1 shows a perspective view of an embodiment of the saltwater evaporation mechanism.

Reference is made herein to the attached drawings. Like reference numerals are used throughout the drawings to depict like or similar elements of the saltwater evaporation mechanism. The figures are intended for representative purposes only and should not be considered to be limiting in any respect.

Referring now to FIG. 1, there is shown a perspective and cutaway view of an embodiment of the saltwater evaporation mechanism. The saltwater evaporation mechanism 10 comprises an elevated saltwater reservoir 12 having a base, sidewalls, and an open upper end 13 forming an interior, and a receiving reservoir 39 having a base, sidewalls and an open upper end forming an interior. In some embodiments of saltwater reservoir 12, the interior has a hard plastic liner disposed therein to protect it from corrosion. There are support members 14 forming a structure configured to support the saltwater reservoir 12 in an elevated position. The saltwater reservoir 12 can be removed from the support members 14 if desired. A heat source 20 is positioned under the base of the saltwater reservoir 12 and configured to heat the contents therein. In some embodiments of the saltwater evaporation mechanism 10, there are one or more walls 16 extending between the support members 14, thereby forming an enclosure surrounding the heat source 20 therein and protecting it from the elements. Protection from the elements may be necessary if the saltwater evaporation mechanism 10 is to be utilized outdoors. In some embodiments of the saltwater evaporation mechanism 10, the heat source 20 is a fire fueled by burning fossil fuels, such as natural gas or coal. In other embodiments of the saltwater evaporation mechanism 10, the heat source 20 is power by electric or solar power.

A tunnel 30 extends from the saltwater reservoir 12 to the receiving reservoir 39. The tunnel 30 has a top panel 32, a bottom panel 34, and two side panels 35 forming a partially-enclosed interior having a first end 36 and a second end 37. The top panel 32 further includes an extended portion 22 overhanging and extending beyond the first end 36 of the tunnel 30 such that the extended portion 22 of the top panel 32 covers the open upper end 13 of the saltwater reservoir 12 entirely, i.e. the perimeter edge of the top panel 32 extends beyond the perimeter of the rim of the reservoir 12. The second end 37 of the tunnel 30 is positioned above the receiving reservoir 39. There are support legs 18 disposed underneath the extended portion 22 of the top panel 32 and additional support legs 17 disposed underneath the tunnel 30 toward the second end 36 thereof. In some embodiments of the saltwater evaporation mechanism 10, there are wheels 19 secured to the bottom of support legs 17, 18, which allow the tunnel 30 to be moved and rotated away from the saltwater reservoir 12 when desired, such as when refilling the saltwater reservoir 12. The wheels 19 can be locked to prevent movement as well as bolted into the ground to secure the tunnel 30 when desiring to fix the tunnel 30 in place. In some embodiments, the wheels 19 include wheel covers 21 disposed thereon to protect the wheels 19. Appropriate materials are used to construct the tunnel 30, including strengthened or bulletproof glass, stainless steel, or hardened plastic.

In some embodiments of the saltwater evaporation mechanism 10, there is a flexible covering such as a tarp or an insulated blanket that is draped over the entire extended portion 22 of the top panel 32 to assist in retaining any water vapor rising from the saltwater reservoir 12 and to ensure that the water vapor is only directed toward the tunnel 30. One embodiment of the of the cover comprises a glass covering having a top element that rests on the extended portion 22 of the top panel 32 and three side elements that drape over the exposed sides of the saltwater reservoir 12, namely the sides that are not directly adjacent to the tunnel 30.

In use, saltwater 15, i.e. an aqueous solution containing water and salt, is poured into the saltwater reservoir 12. The heat source 20 applies an amount of heat sufficient to transform the water component of saltwater 15 into water vapor. The water vapor travels upward from the saltwater reservoir 12, along the undersurface of the top panel 32, and through the tunnel 30, while the salt component remains in the saltwater reservoir 12. As the water vapor cools in the tunnel 30 in the absence of the heat source 20, the water vapor condenses into liquid fresh water 26. The fresh water 26 then travels through the tunnel 30 and into the receiving reservoir 39. In some embodiments of the saltwater evaporation mechanism 10, there is a notch or opening 38 along a sidewall of the saltwater reservoir 12 to allow for more efficient transfer of the water vapor from the area above the open upper end to the interior of the tunnel 30. The opening 38 has a lower height than the surrounding sidewall of the saltwater reservoir.

Figure 2:
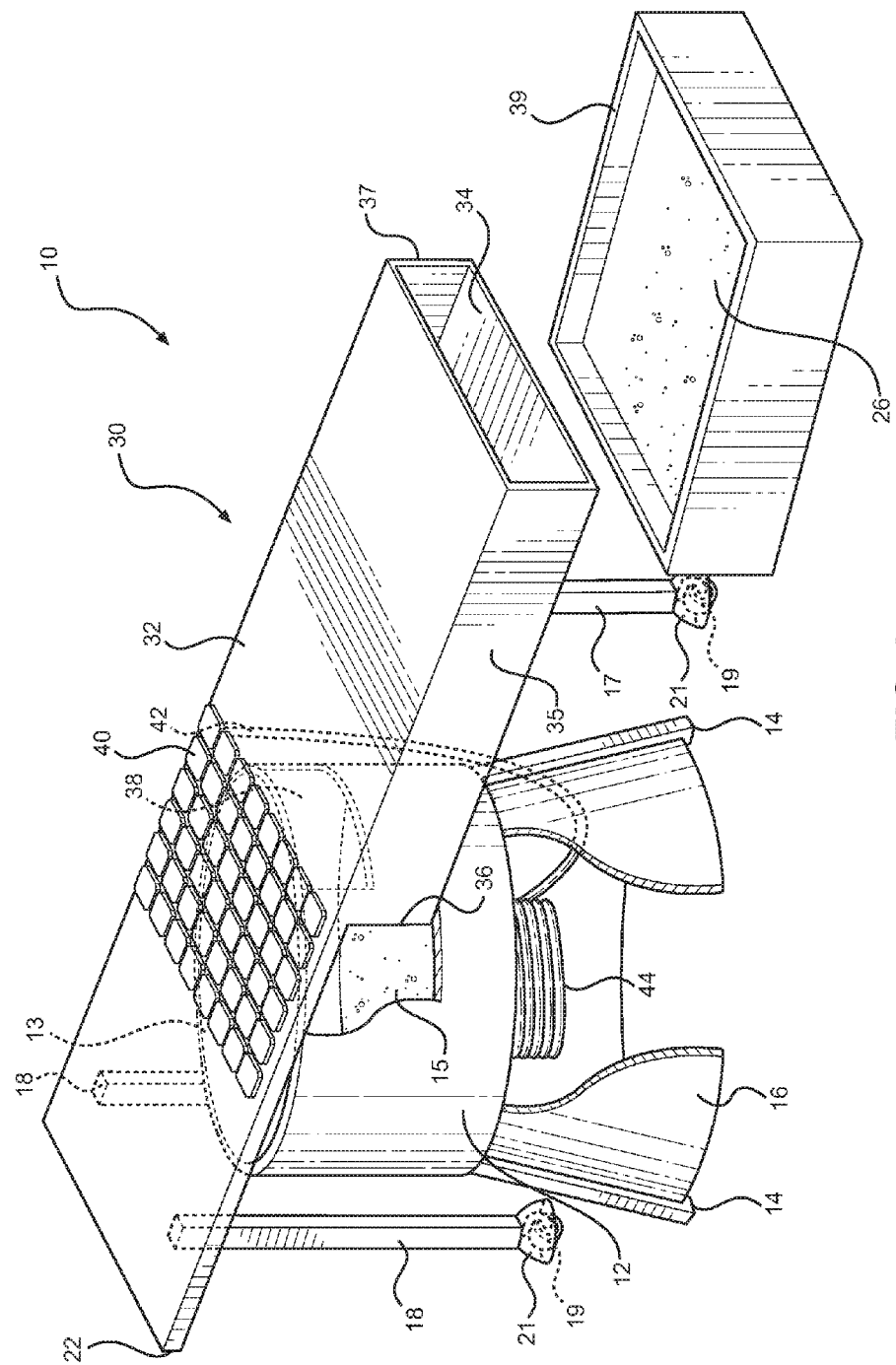
FIG. 2 shows a perspective view of an alternative embodiment of the saltwater evaporation mechanism with a solar panel and heating coil.

Referring now to FIG. 2, there is shown a perspective view of an alternative embodiment of the saltwater evaporation mechanism having a solar panel and heating coils. A solar panel 40 is disposed above of the top panel 32 of the tunnel 30. In one embodiment, the solar panel 40 includes an array of photovoltaic cells. The heating coils 44 are mounted to the bottom of the saltwater reservoir 12 and are operably connected to the solar panel 40 via electrical wiring 42. The electricity from the solar panel 40 powers the heating coils 44, causing the saltwater within the saltwater reservoir 12 to heat up. Such a configuration allows the saltwater evaporation mechanism 10 to operate without relying on combustible fuels. The heating coils 44 are surrounded by an enclosure to protect it from outdoor elements. In some embodiments, there is a battery operably connected to the solar panel 40 and the heating coils 42, wherein the battery is configured to store energy from the sun and release it to the heating coils 42 at a later point in time.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A saltwater evaporation mechanism, comprising:
   a reservoir having a base, a sidewall, and an open upper end;
   a heat source disposed beneath the base of the reservoir, the heat source configured to heat saltwater within the reservoir to create water vapor;
   a receiving reservoir having a base, a sidewall, and an open upper end;
   a tunnel extending from the reservoir to the receiving reservoir, the tunnel including a top panel, a bottom panel, a side panel, a first end, and a second end;
   the top panel including an extended portion, the extended portion extending beyond the first end; and
   wherein the first end is positioned adjacent to the reservoir such that the extended portion is situated above the reservoir and the second end of the tunnel is disposed above the receiving reservoir.

2. The saltwater evaporation mechanism of claim 1, wherein the reservoir is placed at an elevated position with respect to the receiving reservoir and wherein the tunnel is positioned at an angle such that the first end is raised relative to the second end.

3. The saltwater evaporation mechanism of claim 2, further comprising a solar panel mounted to the tunnel, the solar panel operably connected to the heat source.

4. The saltwater evaporation mechanism of claim 3, wherein the heat source is a heating coil.

5. The saltwater evaporation mechanism of claim 1, further comprising a support leg disposed underneath the second end and a support leg disposed underneath the extended portion of the top panel.

6. The saltwater evaporation mechanism of claim 5, further comprising wheels secured to a bottom surface of the support legs.

7. The saltwater evaporation mechanism of claim 1, wherein a perimeter of the extended portion extends beyond a perimeter of the reservoir.

* * * * *